United States Patent
Ha et al.

(10) Patent No.: US 7,454,517 B2
(45) Date of Patent: Nov. 18, 2008

(54) NETWORK ELECTRIC DEVICE

(75) Inventors: Sam-Chul Ha, Changwon-Shi (KR); Seung-Myun Baek, Changwon-Shi (KR); Koon-Seok Lee, Changwon-Shi (KR); Yong-Tae Kim, Gimhae-Shi (KR)

(73) Assignee: LG. Electronics Inc., Seoul (KR)

( * ) Notice: Subject to any disclaimer, the term of this patent is extended or adjusted under 35 U.S.C. 154(b) by 232 days.

(21) Appl. No.: 10/558,435

(22) PCT Filed: May 14, 2004

(86) PCT No.: PCT/KR2004/001148

§ 371 (c)(1),
(2), (4) Date: Nov. 29, 2005

(87) PCT Pub. No.: WO2004/107089

PCT Pub. Date: Dec. 9, 2004

(65) Prior Publication Data

US 2006/0248228 A1 Nov. 2, 2006

(30) Foreign Application Priority Data

May 30, 2003 (KR) .............. 10-2003-0034962
Mar. 31, 2004 (KR) .............. 10-2004-0022185

(51) Int. Cl.
*G06F 15/16* (2006.01)
*G06F 15/173* (2006.01)

(52) U.S. Cl. .............. 709/236; 709/208; 709/224; 709/228; 709/230; 709/245

(58) Field of Classification Search .............. 709/223, 709/224, 227, 228, 245, 208, 230, 236; 370/400
See application file for complete search history.

(56) References Cited

U.S. PATENT DOCUMENTS

2003/0088703 A1* 5/2003 Kim .............. 709/245

FOREIGN PATENT DOCUMENTS

WO WO 02/097555 A2 * 12/2002

OTHER PUBLICATIONS

Kent et al. RFC 2401 Security Architecture for the Internet Protocol. Nov. 1998, IETF. pp. 1-31.*

(Continued)

*Primary Examiner*—Abdullahi Salad
*Assistant Examiner*—Imad Hussain
(74) *Attorney, Agent, or Firm*—McKenna Long & Aldridge LLP

(57) ABSTRACT

The present invention discloses a home network system using a living network control protocol. The home network system includes: a network based on a predetermined protocol; at least one electric device connected to the network; and a network manager connected to the network, for controlling and/or monitoring the electric device, wherein the protocol includes an application layer, a network layer, a data link layer and a physical layer, wherein the physical layer further includes a special protocol for providing an interface with a dependent transmission medium, and the network layer further includes a home code control sub-layer for managing a home code form network security when accessing the dependent transmission medium; and wherein an application layer protocol data unit (APDU) is transmitted between the application layer and the network layer, a network layer protocol data unit (NPDU) is transmitted between the network layer and the data link layer and the between the network layer and the home code control sub-layer, a home code control sub-layer protocol data unit (HCNPDU) is transmitted between the home code control sub-layer and the data link layer, and a data frame unit is transmitted between the data link layer and the physical layer.

20 Claims, 5 Drawing Sheets

OTHER PUBLICATIONS

Lee et al. A New Home Network Protocol For Controlling And Monitoring Home Appliances—HNCP. 2002. IEEE. pp. 312-313.*

Lee et al. Home Network Control Protocol for Networked Home Appliances and Its Application. Oct. 2002. pp. 1-7.*

Koon-Seok Lee, et al., "A New Control Protocol for Home Appliances—LnCP," In: International Symposium on Industrial Electronics, 2001, Proceedings, ISIE 2001, Jun. 12-16, 2001, pp. 286-291.

Yi-Min Wang, et al, "Towards Dependable Home Networking: An Experience Report," In: Proceedings International Conference on Dependable Systems and Networks, 2000, DSN 200025, Jun. 28, 2000, Los Alamitos, CA, USA, IEEE Computer Society, pp. 43-48.

* cited by examiner

NETWORK ELECTRIC DEVICE

This application claims the benefit of Korean Patent Application No. 2003-0034962, filed on May 30, 2003; Korean Patent Application No. 2004-0022185, filed Mar. 31, 2004 and PCT Application No. PCT/KR2004/001148, filed on May 14, 2004, which are hereby incorporated by reference for all purposes as if fully set forth herein.

TECHNICAL FIELD

The present invention relates to a home network system, and more particularly to, a home network system using a living network control protocol.

BACKGROUD ART

A home network connects various digital home appliances so that the user can always enjoy convenient, safe and economic life services inside or outside the house. Refrigerators or washing machines called white home appliances have been gradually digitalized due to the development of digital signal processing techniques, home appliance operating system techniques and high speed multimedia communication techniques have been integrated on the digital home appliances, and new information home appliances have been developed, to improve the home network.

As shown in Table 1, the home network is classified into a data network, an entertainment network and a living network by types of services.

TABLE 1

| Classification | Function | Service type |
| --- | --- | --- |
| Data network | Network between PC and peripheral devices | Data exchange, internet service, etc. |
| Entertainment network | Network between A/V devices | Music, animation service, etc. |
| Living network | Network for controlling home appliances | Home appliances control, home automation, remote meter reading, message service, etc. |

Here, the data network is built to exchange data between a PC and peripheral devices or provide an internet service, and the entertainment network is built between home appliances using audio or video information. In addition, the living network is built to simply control home appliances, such as home automation or remote meter reading.

A conventional home network system includes a master device which is an electric device for controlling an operation of the other electric devices or monitoring a status thereof, and a slave device which is an electric device having a function of responding to the request of the master device and a function of notifying a status change according to characteristics of the electric devices or other factors. Exemplary electric devices include home appliances for the living network service such as a washing machine and a refrigerator, home appliances for the data network service and the entertainment network service, and products such as a gas valve control device, an automatic door device and an electric lamp.

However, the conventional arts do not suggest a general communication standard for providing functions of controlling and monitoring electric devices in a home network system.

DISCLOSURE OF THE INVENTION

The present invention is achieved to solve the above problems. An object of the present invention is to provide a home network system using a control protocol which is a general communication standard for providing functions of controlling and monitoring electric devices in the home network system.

Another object of the present invention is to provide a home network system using a living network control protocol as a general communication standard.

Yet another object of the present invention is to provide united interfaces for transmitting data in each layer of a living network control protocol.

In order to achieve the above-described objects of the invention, there is provided a home network system including: a network based on a predetermined protocol; at least one electric device connected to the network; and a network manager connected to the network, for controlling and monitoring the electric device, wherein the protocol includes an application layer, a network layer, a data link layer and a physical layer, wherein the physical layer further includes a special protocol for providing an interface with a dependent transmission medium, and the network layer further includes a home code control sub-layer for managing a home code for network security when accessing the dependent transmission medium; and wherein an application layer protocol data unit (APDU) is transmitted between the application layer and the network layer, a network layer protocol data unit (NPDU) is transmitted between the network layer and the data link layer and between the network layer and the home code control sub-layer, a home code control sub-layer protocol data unit (HCNPDU) is transmitted between the home code control sub-layer and the data link layer, and a data frame unit is transmitted between the data link layer and the physical layer.

Preferably, the APDU includes an APDU header and a protocol data unit (PDU), and the PDU is a message transmitted from an application software. Preferably, the NPDU includes an NPDU header, the APDU and an NPDU trailer.

Preferably, the HCNPDU includes a home code and the NPDU.

Preferably, the data frame unit includes a frame header, the NPDU or HCNPDU and a frame trailer.

Preferably, the APDU header includes an APDU length (AL) field, an APDU header length (AHL) field and an application layer option (ALO) field.

Preferably, the AHL field has at least 3 bytes.

Preferably, the NPDU header includes a start of LnCP packet (SLP) field, a destination address (DA) field, a sender address (SA) field, a packet length (PL) field and a network layer control (NLC) field.

Preferably, the SLP field has 8 bits, the DA field has 16 bits, the SA field has 16 bits, the PL field has 8 bits and the NLC field has 24 bits.

Preferably, the NPDU header is formed in order of the SLP field, the DA field, the SA field, the PL field and the NLC field.

Preferably, the NLC field includes a service priority (SP) field, an NPDU header length (NHL) field, a protocol version (PV) field, a network layer packet type (NPT) field, a transmission counter (TC) field and a packet number (PN) field.

Preferably, the SP field has 3 bits, the NHL field has 5 bits, the PV field has 8 bits, the NPT field has 4 bits, the TC field has 2 bits and the PN field has 2 bits.

Preferably, the NLC field is formed in order of the SP field, the NHL field, the PV field, the NPT field, the TC field and the PN field.

Preferably, the SP field is set as a first code for transmitting an urgent message, a second code for transmitting a general packet or an event message according to an online or offline status change, a third code for transmitting a notification message for composing a network or a general event message, and a fourth code for transmitting a data by download or upload mechanism. More preferably, the first code is 0, the second code is 1, the third code is 2 and the fourth code is 3.

Preferably, the upper 4 bits of the PV field form a version field, and the lower 4 bits thereof form a sub-version field.

Preferably, the NPT field is set as a first code for a request packet, a second code for a successful response packet, a third code for a failed response packet, a fourth code for a notification packet, and a fifth code for an interface with the home code control sub-layer. More preferably, the first code is 0, the second code is 4, the third code is 5, the fourth code is 8 and the fifth code is 13 to 15.

Preferably, the TC field is set as a first code showing initial transmission, and the first code is set to be increased by a predetermined size upon the retry request. More preferably, the first code is 0 and the size is 1.

Preferably, the PN field is set to be increased by a predetermined size in every new packet transmission, and to maintain a previous value in the same packet retry. More preferably, the size is 1.

Preferably, the NPDU trailer includes a cyclic redundancy check (CRC) field for checking an error, and an end of LnCP packet (ELP) field. More preferably, the NPDU trailer is formed in order of the CRC field and the ELP field.

Preferably, the CRC field has 16 bits and the ELP field has 8 bits.

Preferably, the home code has 4 bytes.

Preferably, the protocol is a living network control protocol (LnCP).

According to one aspect of the present invention, in a storage medium for storing a home code control sub-layer protocol data unit (HCNPDU) transmitted in a home network system including an electric device and a network manager communicating with each other through a network based on a predetermined protocol, the HCNPDU includes a home code and a network layer protocol data unit (NPDU).

BEST MODE FOR CARRYING OUT THE INVENTION

A home network system in accordance with the present invention will now be described in detail with reference to the accompanying drawings.

Figure 1:
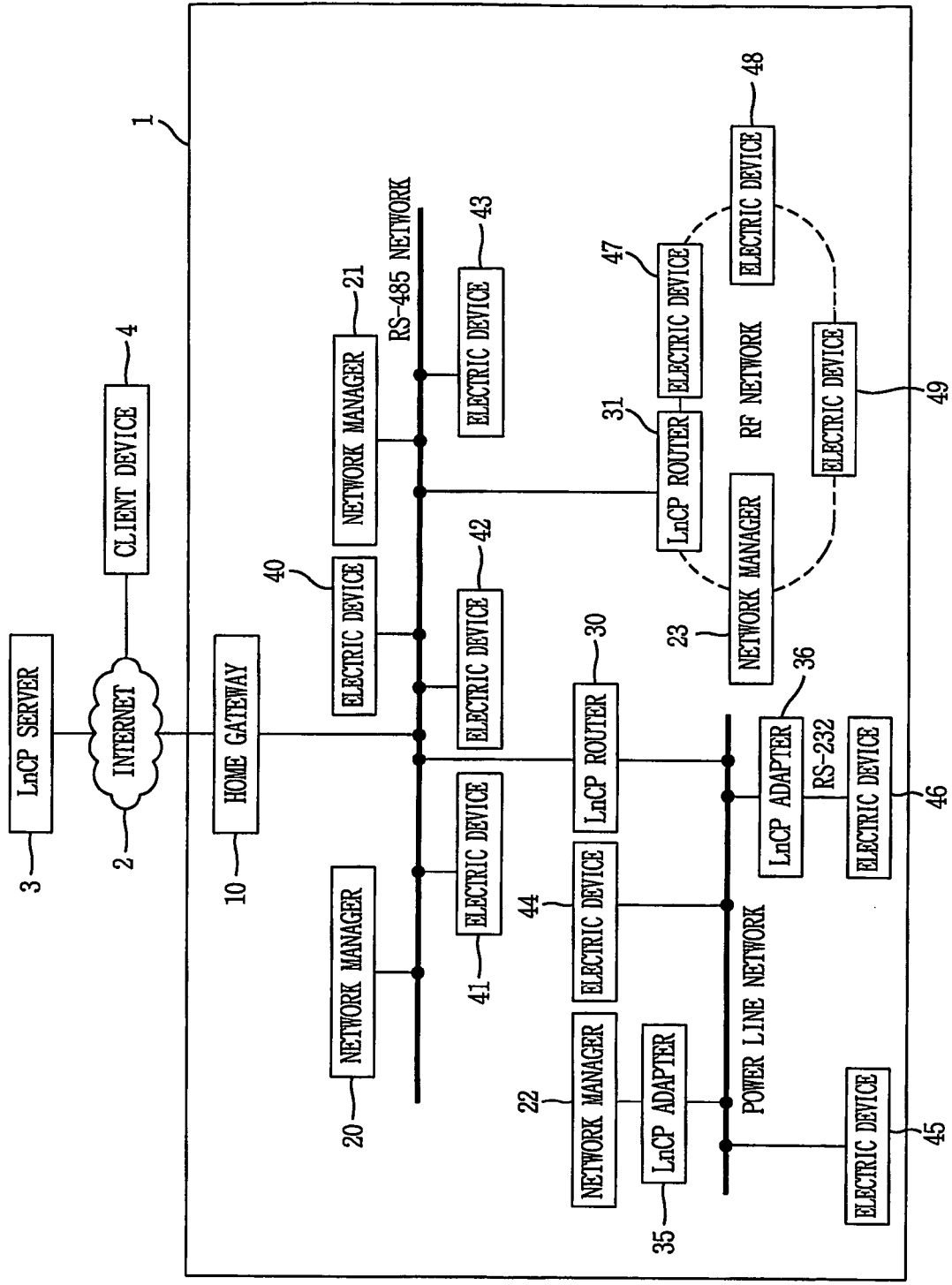
FIG. 1 is a structure view illustrating a home network system in accordance with the present invention.

FIG. 1 is a structure view illustrating the home network system in accordance with the present invention.

Referring to FIG. 1, the home network system 1 accesses an LnCP server 3 through an internet 2, and a client device 4 accesses the LnCP server 3 through the internet 2. That is, the home network system 1 is connected to communicate with the LnCP server 3 and/or the client device 4.

An external network of the home network system 1 such as the internet 2 includes additional constitutional elements according to a kind of the client device 4. For example, when the client device 4 is a computer, the internet 2 includes a Web server (not shown), and when the client device 4 is an internet phone, the internet 2 includes a Wap server (not shown).

The LnCP server 3 accesses the home network system 1 and the client device 4 according to predetermined login and logout procedures, respectively, receives monitoring and control commands from the client device 4, and transmits the commands to the network system 1 through the internet 2 in the form of predetermined types of messages. In addition, the LnCP server 3 receives a predetermined type of message from the home network system 1, and stores the message and/or transmits the message to the client device 4. The LnCP server 3 also stores or generates a message, and transmits the message to the home network system 1. That is, the home network system 1 accesses the LnCP server 3 and downloads provided contents.

The home network system 1 includes a home gateway 10 for performing an access function to the internet 2, network managers 20 to 23 for performing a function of setting an environment and managing electric devices 40 to 49, LnCP routers 30 and 31 for access between transmission media, LnCP adapters 35 and 36 for connecting the network manager 22 and the electric device 46 to the transmission medium, and the plurality of electric devices 40 to 49.

The network of the home network system 1 is formed by connecting the electric devices 40 to 49 through a shared transmission medium. A data link layer uses a non-standardized transmission medium such as RS-485 or small output RF, or a standardized transmission medium such as a power line and IEEE 802.11 as the transmission medium.

The network of the home network system 1 is separated from the internet 2, for composing an independent network for connecting the electric devices through wire or wireless transmission medium. Here, the independent network includes a physically-connected but logically-divided network.

The home network system 1 includes master devices for controlling operations of the other electric devices 40 to 49 or monitoring statuses thereof, and slave devices having functions of responding to the request of the master devices and notifying their status change information. The master devices include the network managers 20 to 23, and the slave devices include the electric devices 40 to 49. The network managers 20 to 23 include information of the controlled electric devices 40 to 49 and control codes, and control the electric devices 40 to 49 according to a programmed method or by receiving inputs from the LnCP server 3 and/or the client device 4. Still referring to FIG. 1, when the plurality of network managers 20 to 23 are connected, each of the network managers 20 to 23 must be both the master device and the slave device, namely physically one device but logically the device (hybrid device) for simultaneously performing master and slave functions in order to perform information exchange, data synchronization and control with the other network managers 20 to 23.

In addition, the network managers 20 to 23 and the electric devices 40 to 49 can be connected directly to the network (power line network, RS-485 network and RF network) or through the LnCP routers 30 and 31 and/or the LnCP adapters 35 and 36.

The electric devices 40 to 49 and/or the LnCP routers 30 and 31 and/or the LnCP adapters 35 and 36 are registered in the network managers 20 to 23, and provided with intrinsic logical addresses by products (for example, 0x00, 0x01, etc.). The logical addresses are combined with product codes (for example, 0x02 of air conditioner and 0x01 of washing machine), and used as node addresses. For example, the electric devices 40 to 49 and/or the LnCP routers 30 and 31 and/or the LnCP adapters 35 and 36 are identified by the node addresses such as 0x0200 (air conditioner 1) and 0x0201 (air conditioner 2). A group address for identifying at least one electric device 40 to 49 and/or at least one LnCP router 30 and 31 and/or at least one LnCP adapter 35 and 36 at a time can be used according to a predetermined standard (all identical products, installation space of products, user, etc.). In the group address, an explicit group address is a cluster for designating a plurality of devices by setting an address option value (flag mentioned below) as 1, and an implicit group address designates a plurality of devices by filling the whole bit values of the logical addresses and/or the product codes with 1. Especially, the implicit group address is called a cluster code.

Figure 2:
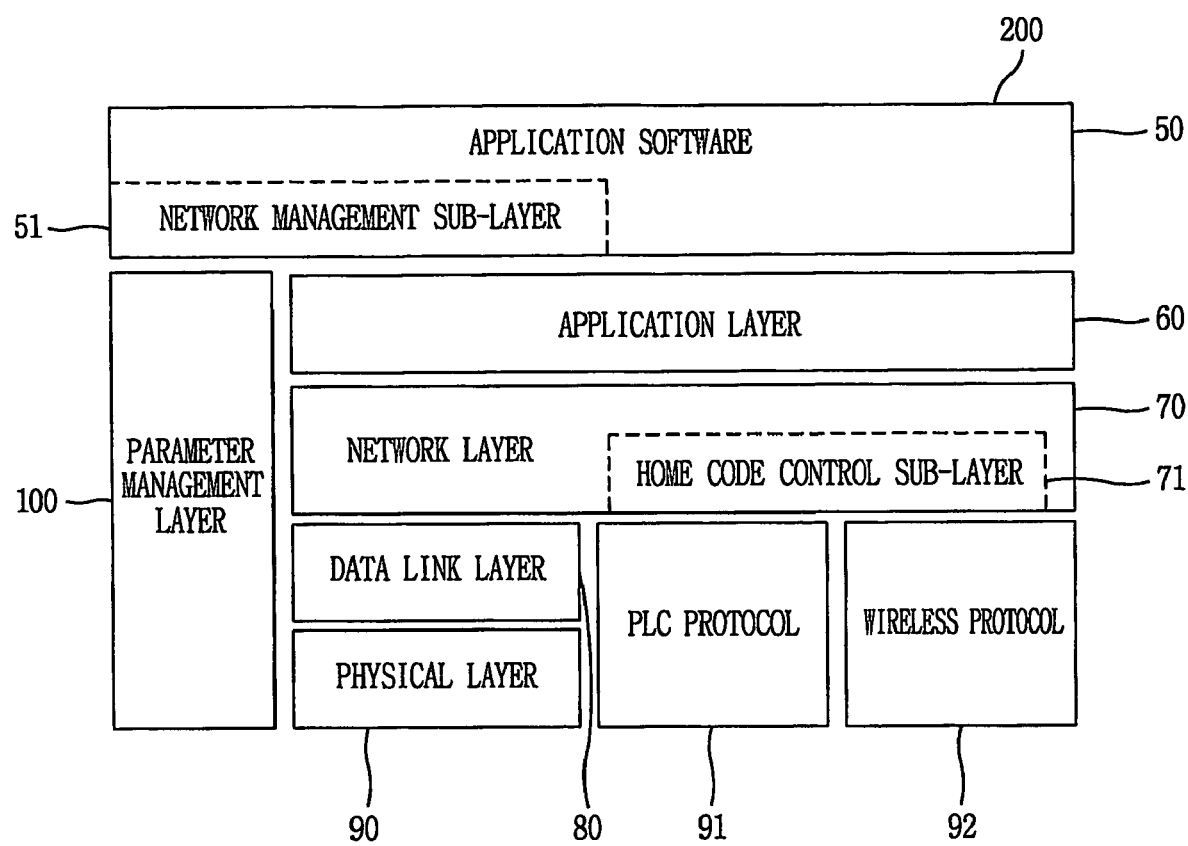
FIG. 2 is a structure view illustrating a living network control protocol stack in accordance with the present invention.

FIG. 2 is a structure view illustrating a living network control protocol stack in accordance with the present invention. The home network system 1 enables the network managers 20 to 23, the LnCP routers 30 and 31, the LnCP adapters 35 and 36 and the electric devices 40 to 49 to communicate with each other according to the living network control protocol (LnCP) of FIG. 2. Therefore, the network managers 20 to 23, the LnCP routers 30 and 31, the LnCP adapters 35 and 36 and the electric devices 40 to 49 perform network communication according to the LnCP.

As illustrated in FIG. 2, the LnCP includes an application software 50 for performing intrinsic functions of the network managers 20 to 23, the LnCP routers 30 and 31, the LnCP adapters 35 and 36 and the electric devices 40 to 49, and providing an interface function with an application layer 60 for remote controlling and monitoring on the network, the application layer 60 for providing services to the user, and also providing a function of forming information or a command from the user in the form of a message and transmitting the message to the lower layer, a network layer 70 for reliably network-connecting the network managers 20 to 23, the LnCP routers 30 and 31, the LnCP adapters 35 and 36 and the electric devices 40 to 49, a data link layer 80 for providing a medium access control function of accessing a shared transmission medium, a physical layer 90 for providing physical interfaces between the network managers 20 to 23, the LnCP routers 30 and 31, the LnCP adapters 35 and 36 and the electric devices 40 to 49, and rules for transmitted bits, and a parameter management layer 100 for setting and managing node parameters used in each layer.

In detail, the application software 50 further includes a network management sub-layer 51 for managing the node parameters, and the network managers 20 to 23, the LnCP routers 30 and 31, the LnCP adapters 35 and 36 and the electric devices 40 to 49 which access the network. That is, the network management sub-layer 51 performs a parameter management function of setting or using the node parameter values through the parameter management layer 100, and a network management function of composing or managing the network when the device using the LnCP is a master device.

When the network which the network managers 20 to 23, the LnCP routers 30 and 31, the LnCP adapters 35 and 36 and the electric devices 40 to 49 access is a dependent transmission medium such as a power line, IEEE 802.11 and wireless (for example, when the LnCP includes a PLC protocol and/or wireless protocol), the network layer 70 further includes a home code control sublayer 71 for performing a function of setting, managing and processing home codes for logically dividing each individual network. When the individual networks are physically divided by an independent transmission medium such as RS-485, the home code control sub-layer 71 is not included in the LnCP. Each of the home codes is comprised of 4 bytes, and set as random values or designated values of the user.

Figure 3A:
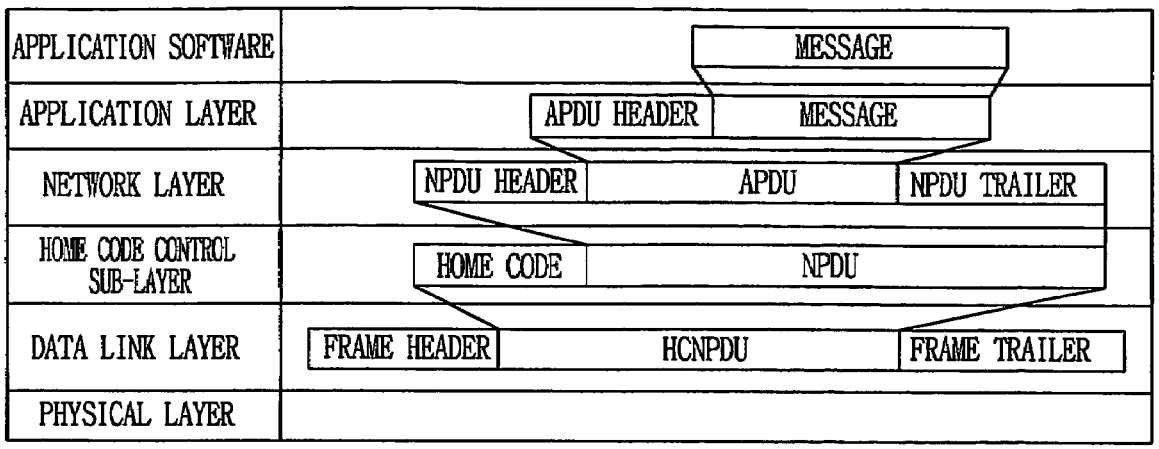
FIGS. 3A and 3B are structure views illustrating interfaces between layers of FIG. 2, respectively.
Figure 3B:
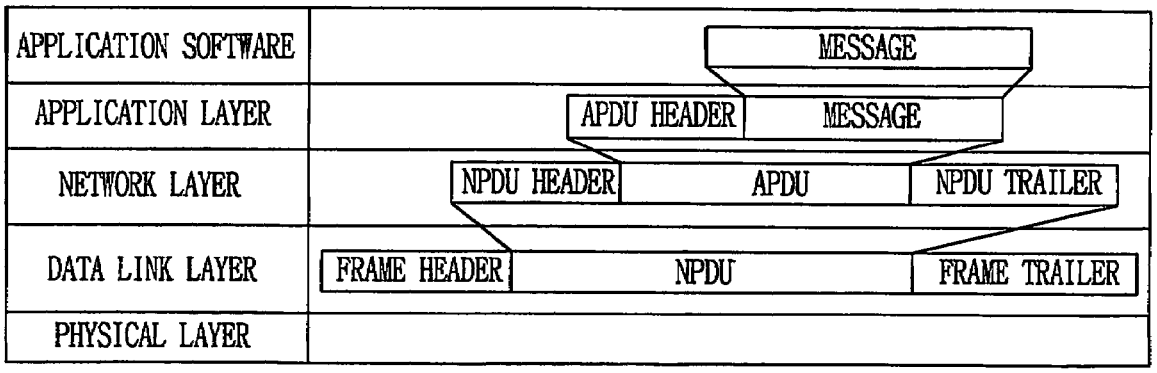

FIGS. 3A and 3B are structure views illustrating interfaces between the layers of FIG. 2, respectively.

FIG. 3A illustrates the interfaces between the layers when the physical layer 90 is connected to the dependent transmission medium, and FIG. 3B illustrates the interfaces between the layers when the physical layer 90 is connected to the independent transmission medium.

The home network system 1 adds headers and trailers required by each layer to protocol data units (PDU) from the upper layers, and transmit them to the lower layers.

As shown in FIGS. 3A and 3B, an application layer PDU (APDU) is a data transmitted between the application layer 60 and the network layer 70, a network layer PDU (NPDU) is a data transmitted between the network layer 70 and the data link layer 80 or the home code control sub-layer 71, and a home code control sub-layer PDU (HCNPDU) is a data transmitted between the network layer 70 (precisely, the home code control sub-layer 71) and the data link layer 80. The interface is formed in data frame units between the data link layer 80 and the physical layer 90.

FIGS. 4A to 4F are detailed structure views illustrating the interfaces of FIGS. 3A and 3B, respectively.

Figure 4A:
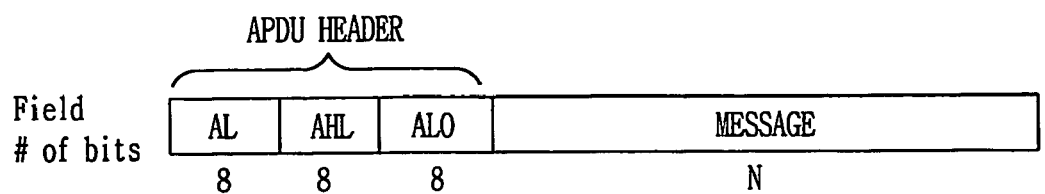
FIGS. 4A to 4F are detailed structure views illustrating the interfaces of FIGS. 3A and 3B, respectively.

FIG. 4A illustrates the APDU structure in the application layer 60.

An APDU length (AL) field shows a length of the APDU (length from AL to message field), and has a minimum value of 4 and a maximum value of 77.

An APDU header length (AHL) field shows a length of an APDU header (length from AL to AL0), normally has 3 bytes, and is extensible to 7 bytes. In the LnCP, the APDU header can be extended to 7 bytes to encode a message field and change an application protocol.

An application layer option (ALO) field extends a message set. For example, when the ALO field is set as 0, if the ALO field contains a different value, message processing is ignored.

The message field processes a control message from the user or event information, and is changed by the value of the ALO field.

Figure 4B:
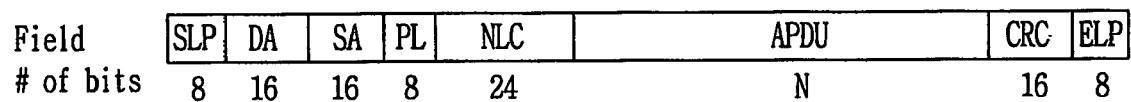
Figure 4C:
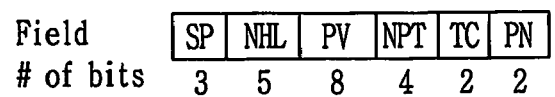

FIG. 4B illustrates the NPDU structure in the network layer 70, and FIG. 4C illustrates a detailed NLC structure of the NPDU.

A start of LnCP packet (SLP) field shows start of a packet and has a value of 0x02.

Destination address (DA) and source address (SA) fields are node addresses of a receiver and a sender of a packet, and have 16 bits, respectively. The most significant 1 bit includes a flag indicating a group address, the succeeding 7 bits include a kind of a product (product code), and the lower 8 bits include a logical address for distinguishing the plurality of network managers 20 to 23 of the same kind and the plurality of electric devices 40 to 49 of the same kind.

A packet length (PL) field shows the whole length of the NPDU, and has a minimum value of 12 bytes and a maximum value of 100 bytes.

A service priority (SP) field gives transmission priority to a transmission message and has 3 bits. Table 2 shows the priority of each transmission message.

When a slave device responds to a request of a master device, the slave device takes the priority of the request message from the master device.

TABLE 2

| Priority | Value | Application layer |
|---|---|---|
| High | 0 | When an urgent message is transmitted |
| Middle | 1 | When a normal packet is transmitted |
| | | When an event message for online or offline status change is transmitted |
| Normal | 2 | When a notification message for composing a network is transmitted |
| | | When a normal event message is transmitted |
| Low | 3 | When a data is transmitted by download or upload mechanism |

An NPDU header length (NHL) field extends an NPDU header (NLC field of SLP), normally has 9 bytes, and is extensible maximally to 16 bytes.

A protocol version (PV) field is an one-byte field showing a version of a used protocol. The upper 4 bits include a version field and the lower 4 bits include a sub-version field. The version and the sub-version are represented by the hexadecimal, respectively.

A network layer packet type (NPT) field is a 4 bit field for distinguishing a kind of a packet in the network layer 70. The LnCP includes a request packet, a response packet and a notification packet. The NPT field of a master device must be set as the request packet or the notification packet, and the NPT field of a slave device must be set as the response packet or the notification packet. Table 3 shows NPT values by kinds of packets.

TABLE 3

| Explanation | Value |
|---|---|
| Request packet | 0 |
| Not used | 1~3 |
| Response packet | 4 |
| Not used | 5~7 |
| Notification packet | 8 |
| Not used | 9~12 |
| Reserved value for interface with the home code control sub-layer | 13~15 |

A transmission counter (TC) field is a 2-bit field for retrying a request packet when the request packet or response packet is not successfully transmitted due to a communication error in the network layer 70, or repeatedly transmitting a notification packet to improve a transmission success ratio. A receiver can check a duplicate message by using a value of the TC field. Table 4 shows the range of the values of the TC field by the NPT values.

TABLE 4

| Kind of packet | Value (range) |
|---|---|
| Request packet | 1~3 |
| Response packet | 1 |
| Notification packet | 1~3 |

A packet number (PN) field has 2 bits, and is used to check a duplicate packet in a slave device with the TC field and process a plurality of communication cycles in a master device. Table 5 shows the range of the values of the PN field by the NPT values.

TABLE 5

| Kind of packet | Value (range) |
|---|---|
| Request packet | 0~3 |
| Response packet | Copy a PN field value of a request packet |
| Notification packet | 0~3 |

An APDU field is a protocol data unit of the application layer 60 transmitted between the application layer 60 and the network layer 70. The APDU field has a minimum value of 0 byte and a maximum value of 88 bytes.

A cyclic redundancy check (CRC) field is a 16-bit field for checking an error of a received packet (from SLP to APDU).

An end of LnCP packet (ELP) field shows end of a packet and has a value of 0x03. Although a data corresponding to the length of the PL field is received, if the ELP field is not checked, it is deemed to be a packet error.

Figure 4D:
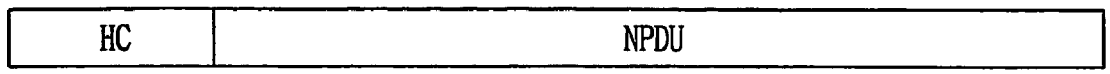

FIG. 4D illustrates the HCNPDU structure in the home code control sub-layer 71.

As depicted in FIG. 4D, a home code (HC) field is added to the upper portion of the NPDU.

The home code is comprised of 4 bytes, and has a unique value within the line distance where a packet can be transmitted.

Figure 4E:
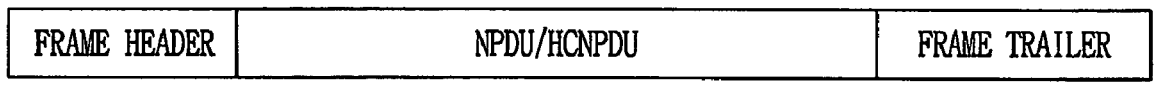

FIG. 4E illustrates a frame structure in the data link layer 80.

The structure of the header and the trailer of the data link layer frame of the LnCP is changed according to transmission media. When the data link layer 80 uses a non-standardized transmission medium, the header and the trailer of the frame must have null fields, and when the data link layer 80 uses a standardized transmission medium, the header and the trailer of the frame are formed as prescribed by the protocol. An NPDU field is a data unit transmitted from the upper network layer 70, and an HCNPDU field is a data unit obtained by adding 4 bytes of home code to the front portion of the NPDU, when the physical layer 90 is a dependent transmission medium such as a power line or IEEE 802.11. The data link layer 80 processes the NPDU and the HCNPDU in the same manner.

Figure 4F:
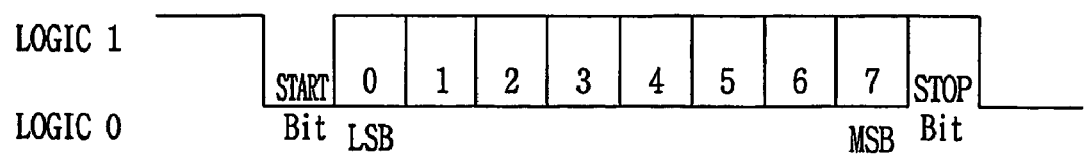

FIG. 4F illustrates a frame structure in the physical layer 90.

The physical layer 90 of the LnCP handles a function of transmitting and receiving a physical signal to a transmission medium. The data link layer 80 can use a non-standardized transmission medium such as RS-485 or small output RF or a standardized transmission medium such as a power line or IEEE. 802.11 as the physical layer 90 of the LnCP. The home network system 1 using the LnCP employs a universal asynchronous receiver and transmitter (UART) frame structure and a signal level of RS-232, so that the network managers 20 to 23 and the electric devices 40 to 49 can interface with RS-485, the LnCP routers 30 and 31 or the LnCP adapters 35 and 36. When the UART is connected between the devices by using a serial bus, the UART controls flow of bit signals on a communication line. In the LnCP, a packet from the upper layer is converted into 10 bits of UART frame unit as shown in FIG. 4f, and transmitted through the transmission medium. The UART frame includes one bit of start bit, 8 bits of data and one bit of stop bit, and does not use a parity bit. The UART frame is transmitted in the order of the start bit to stop bit. When the home network system 1 using the LnCP employs the UART, it does not have additional frame header and frame trailer.

The aforementioned interfaces including the APDU, the NPDU/HCNPDU and the frame can be stored in a built-in storage means or storage medium of the network managers 20 to 23 or the electric devices 40 to 49 in the home network system 1, or a portable storage medium.

As discussed earlier, the present invention provides the home network system using the control protocol which is the general communication standard for providing the functions of controlling and monitoring the electric devices in the home network system.

In addition, the present invention provides the home network system using the LnCP as the general communication standard.

Furthermore, the present invention provides the united interfaces for transmitting data in each layer of the LnCP.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A computer readable storage device, storing a protocol data unit for use by a network electric device to communicate with other network devices, the protocol comprising:
   an application layer,
   a network layer,
   a data link layer, and
   a physical layer,
   wherein the physical layer further comprises a special protocol for providing an interface with a dependent transmission medium, and the network layer further comprises a home code control sub-layer for managing a home code for network security when accessing the dependent transmission medium,
   wherein an application layer protocol data unit (APDU) is transmitted between the application layer and the network layer, a network layer protocol data unit (NPDU) is transmitted between the network layer and the data link layer and between the network layer and the home code control sub-layer, a home code control sub-layer protocol data unit (HCNPDU) is transmitted between the home code control sub-layer and the data link layer, and a data frame unit is transmitted between the data link layer and the physical layer,
   wherein the NPDU comprises an NPDU header, the APDU and an NPDU trailer,
   wherein the NPDU header comprises a start of packet (SLP) field, a destination address (DA) field, a sender address (SA) field, a packet length (PL) field and a network layer control (NLC) field,
   wherein the NLC field comprises a service priority (SP) field, an NPDU header length (NHL) field, a protocol version (PV) field, a network layer packet type (NPT) field, a transmission counter (TC) field and a packet number (PN) field, and
   wherein the NPT field is set as a first code for a request packet, a second code for a successful response packet, a third code for a failed response packet, a fourth code for a notification packet, and a fifth code for an interface with the home code control sub-layer.

2. The device of claim 1, wherein the APDU comprises an APDU header and a protocol data unit (PDU).

3. The device of claim 2, wherein the APDU header comprises an APDU length (AL) field, an APDU header length (AHL) field and an application layer option (ALO) field.

4. The device of claim 3, wherein the APDU header has at least 3 bytes.

5. The device of claim 1, wherein the HCNPDU comprises a home code and the NPDU.

6. The device of claim 5, wherein the home code has 4 bytes.

7. The device of claim 1, wherein the data frame unit comprises a frame header, the NPDU or HCNPDU and a frame trailer.

8. The device of claim 1, wherein the SLP field has 8 bits, the DA field has 16 bits, the SA field has 16 bits, the PL field has 8 bits and the NLC field has 24 bits.

9. The device of claim 1, wherein the NPDU header is formed in order of the SLP field, the DA field, the SA field, the PL field and the NLC field.

10. The device of claim 1, wherein the SP field has 3 bits, the NHL field has 5 bits, the PV field has 8 bits, the NPT field has 4 bits, the TC field has 2 bits and the PN field has 2 bits.

11. The device of claim 1, wherein the NLC field is formed in order of the SP field, the NHL field, the PV field, the NPT field, the TC field and the PN field.

12. The device of claim 1, wherein the SP field is set as a first code for transmitting an urgent message, a second code for transmitting a general data or an event message according to an online or offline status change, a third code for transmitting a general event message or a notification message for composing a network, and a fourth code for transmitting a data by download or upload mechanism.

13. The device of claim 12, wherein the first code is 0, the second code is 1, the third code is 2 and the fourth code is 3.

14. The device of either claim 1 or 10, wherein the upper 4 bits of the PV field form a version field, and the lower 4 bits thereof form a sub-version field.

15. The device of claim 1, wherein the first code is 0, the second code is 4, the third code is 5, the fourth code is 8 and the fifth code is 13 to 15.

16. The device of claim 1, wherein the TC field is set as a first code showing initial transmission, and the first code is set to be increased by a predetermined size upon the retry request.

17. The device of claim 1, wherein the PN field is set to be increased by a predetermined size in every new packet transmission, and to maintain a previous value in the same packet retry.

18. The device of claim 1, wherein the NPDU trailer comprises a cyclic redundancy check (CRC) field for checking an error, and an end of packet (ELP) field.

19. The device of claim 18, wherein the NPDU trailer is formed in order of the CRC field and the ELP field.

20. The device of claim 18, wherein the CRC field has 16 bits and the ELP field has 8 bits.

* * * * *